(12) United States Patent (10) Patent No.: US 12,609,524 B2
Yang et al. (45) Date of Patent: Apr. 21, 2026

(54) BATTERY PACK ACTIVE FUSE CONTROL APPARATUS

(71) Applicant: CONTEMPORARY AMPEREX TECHNOLOGY (HONG KONG) LIMITED, Hong Kong (CN)

(72) Inventors: Jing Yang, Ningde (CN); Zhaoguang Wang, Ningde (CN); Qiandeng Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 151 days.

(21) Appl. No.: 18/595,097

(22) Filed: Mar. 4, 2024

(65) Prior Publication Data

US 2024/0213765 A1 Jun. 27, 2024

Related U.S. Application Data

(63) Continuation of application No. PCT/CN2022/143095, filed on Dec. 29, 2022.

(30) Foreign Application Priority Data

Jan. 7, 2022 (CN) .......................... 202210014976.9

(51) Int. Cl.
*H02H 7/18* (2006.01)
*H02H 1/00* (2006.01)
(52) U.S. Cl.
CPC ............ *H02H 7/18* (2013.01); *H02H 1/0007* (2013.01)
(58) Field of Classification Search
CPC ........ H02H 7/18; H02H 1/0007; H02H 3/087; H01M 10/42; H01M 50/583; Y02E 60/10
See application file for complete search history.

(56) References Cited

U.S. PATENT DOCUMENTS 6,791,207 B2 * 9/2004 Yoshida .............. B60R 16/0315
307/10.6
6,992,463 B2 * 1/2006 Yoshio ................... H02J 7/663
320/136
(Continued)

FOREIGN PATENT DOCUMENTS

CN 103580001 A 2/2014
CN 106104285 A 11/2016
(Continued)

OTHER PUBLICATIONS

The European Patent Office (EPO) The Extended European Search Report for Application No. 22918477.5 Jan. 22, 2025 9 Pages.
(Continued)

*Primary Examiner* — Monica Lewis
*Assistant Examiner* — Nicolas Bellido
(74) *Attorney, Agent, or Firm* — ANOVA LAW GROUP, PLLC

(57) ABSTRACT

A battery pack active fuse control apparatus includes a battery management system and a shunt resistor, where the battery management system includes a short-circuit current detect circuit and a short-circuit current process circuit that are constantly powered. The shunt resistor and an active fuse are connected in series with a power supply loop of a battery pack. The short-circuit current detect circuit is connected to the shunt resistor and the short-circuit current process circuit. The short-circuit current process circuit is connected to the active fuse. The short-circuit current process circuit, upon receiving the short-circuit overcurrent signal, controls the active fuse to break.

15 Claims, 2 Drawing Sheets

(56)  References Cited

U.S. PATENT DOCUMENTS

| | | | | |
|---|---|---|---|---|
| 7,378,819 | B2* | 5/2008 | Wang | H02J 7/92 |
| | | | | 320/112 |
| 10,073,143 | B2 | 9/2018 | Leidich et al. | |
| 10,862,295 | B2 | 12/2020 | Vutetakis et al. | |
| 2003/0075980 | A1 | 4/2003 | Yoshida et al. | |
| 2016/0231799 | A1* | 8/2016 | Birnie | G06F 1/28 |
| 2016/0301224 | A1 | 10/2016 | Kim | |
| 2017/0082693 | A1* | 3/2017 | Leidich | G01R 31/3835 |
| 2018/0269698 | A1 | 9/2018 | Kondo et al. | |
| 2022/0018907 | A1* | 1/2022 | Ekler | G01R 31/382 |

FOREIGN PATENT DOCUMENTS

| | | | | |
|---|---|---|---|---|
| CN | 208062780 | U | 11/2018 | |
| CN | 110962604 | A | 4/2020 | |
| CN | 110979097 | A | 4/2020 | |
| CN | 109428316 | B | 6/2020 | |
| CN | 213243523 | U | 5/2021 | |
| CN | 113690956 | A | 11/2021 | |
| DE | 102015226587 | A1* | 6/2017 | ............ H02H 3/087 |
| EP | 3823087 | A1 | 5/2021 | |
| JP | 2009291045 | A | 12/2009 | |
| JP | 2010251104 | A | 11/2010 | |
| KR | 20060022557 | A | 3/2006 | |

OTHER PUBLICATIONS

State Intellectual Property Office of China Notice of Grant of Invention Patent Right for Application No. 202210014976.9 May 31, 2023 7 pages (including translation).

Yin Nan, et al. "Application of molded case selective protection DC breaker with fuse characteristics." Low voltage apparatus 1 (2011): 52-55.

The World Intellectual Property Organization (WIPO) International Search Report for PCT/CN2022/143095 Mar. 28, 2023 4 Pages (including translation).

* cited by examiner

BATTERY PACK ACTIVE FUSE CONTROL APPARATUS

CROSS-REFERENCE TO RELATED APPLICATIONS

This application is a continuation of International Application No. PCT/CN2022/143095, filed on Dec. 29, 2022, which claims priority to Chinese Patent Application No. 202210014976.9, filed on Jan. 7, 2022 and entitled "BATTERY PACK ACTIVE FUSE CONTROL APPARATUS", the entire contents of both of which are incorporated herein by reference.

TECHNICAL FIELD

This application relates to the field of battery technologies, and in particular, to a battery pack active fuse control apparatus.

BACKGROUND

As a tie between batteries and users, a battery management system (Battery Management System, BMS) mainly manages secondary batteries, with an aim to improve utilization of batteries and prevent battery over-charging and over-discharging, thus extending battery service life and monitoring battery statuses. After a short-circuit occurs in a battery pack, a BMS detects the overcurrent and drives an active fuse to break. The traditional active fuse control scheme involves detecting overcurrent through a current sensor sampling and subsequently executing the operation through software control. However, due to the fact that the current sensor only works when the BMS is awake or the current packet period is limited to 10 ms (millisecond), it is not possible to detect a short circuit in sleep mode, and the detection time is too long to break the fuse within 10 ms. The traditional active fuse control scheme suffers from the drawback of low control reliability.

SUMMARY

According to various embodiments disclosed in this application, a battery pack active fuse control apparatus is provided to alleviate the problem of low control reliability of the active fuse control scheme.

A battery pack active fuse control apparatus, including a battery management system and a shunt resistor, where the battery management system includes a short-circuit current detect circuit and a short-circuit current process circuit that are constantly powered. The shunt resistor and the active fuse are connected in series with a power supply loop of a battery pack. The short-circuit current detect circuit is connected to the shunt resistor and the short-circuit current process circuit. The short-circuit current process circuit is connected to the active fuse. The short-circuit current detect circuit is configured to sample current flowing through the shunt resistor to obtain a shunt current, and when the shunt current exceeds a set threshold, output a short-circuit overcurrent signal to the short-circuit current process circuit. The short-circuit current process circuit, upon receiving the short-circuit overcurrent signal, controls the active fuse to break.

The foregoing battery pack active fuse control apparatus adopts a short-circuit current detect circuit and a short-circuit current process circuit that are constantly powered in the battery management system to perform current sampling and overcurrent detection, respectively. The short-circuit current detect circuit outputs a short-circuit overcurrent signal to the short-circuit current process circuit when the shunt current is greater than a set threshold. The short-circuit current process circuit controls the active fuse to break upon receiving a short-circuit overcurrent signal. In this way, the short-circuit overcurrent detection can be performed without the need to wake up the battery management system, and the active fuse can break in a timely manner when a short-circuit is detected, which improves the reliability of the control of the active fuse.

In one embodiment, the battery management system further includes a power supply chip module, and the short-circuit current process circuit is further configured to, upon receiving the short-circuit overcurrent signal, wake up the power supply chip module.

In one embodiment, the battery management system further includes a digital signal detect module, and the short-circuit current process circuit is further configured to, upon receiving the short-circuit overcurrent signal, control the digital signal detect module to perform overcurrent fault recording.

In one embodiment, the short-circuit current detect circuit includes a current sampling chip and a voltage comparator, the current sampling chip is connected to the shunt resistor and the voltage comparator, and the voltage comparator is connected to the short-circuit current process circuit.

In one embodiment, the shunt resistor is selected based on a short-circuit capability of the battery pack and a voltage sampling range of the current sampling chip.

In one embodiment, a body current withstanding capability of the shunt resistor is greater than a maximum short-circuit capability of a battery system, and when the battery system is short-circuited at a maximum short-circuit current, a voltage difference across the shunt resistor is within the voltage sampling range of the current sampling chip.

In one embodiment, the short-circuit current detect circuit further includes resistor R1 and resistor R2, the resistor R1 and the resistor R2 are connected in series and a common terminal thereof is connected to a non-inverting input terminal of the voltage comparator, another terminal of the resistor R1 is connected to a power supply terminal, another terminal of the resistor R2 is grounded, an inverting input terminal of the voltage comparator is connected to the current sampling chip, and an output terminal of the voltage comparator is connected to the short-circuit current process circuit.

In one embodiment, the short-circuit current detect circuit further includes capacitor C1, capacitor C2, capacitor C3, capacitor C4, capacitor C5, and resistor R4016, where one terminal of the capacitor C1 is connected to pin VS of the current sampling chip, and another terminal of the capacitor C1 is grounded; one terminal of the capacitor C2 is connected to pin REF of the current sampling chip, and another terminal of the capacitor C2 is grounded; one terminal of the resistor R4016 is connected to an output pin of the current sampling chip, another terminal of the resistor R4016 is connected to an inverting input terminal of the voltage comparator, and the another terminal of the resistor R4016 is further grounded through the capacitor C3; one terminal of the capacitor C4 is connected to a non-inverting input terminal of the voltage comparator, and another terminal of the capacitor C4 is grounded; and one terminal of the capacitor C5 is connected to a power supply terminal of the voltage comparator, and another terminal of the capacitor C5 is grounded.

In one embodiment, the short-circuit current process circuit includes a delay chip and a latch, where the delay chip is connected to the short-circuit current detect circuit and the latch, and the latch is connected to a power supply chip module, a digital signal detect module, and a drive module of the active fuse.

In one embodiment, the short-circuit current process circuit further includes switch tube Q1, resistor R3, resistor R4, resistor R5, resistor R6, resistor R7, resistor R9, resistor R10, resistor R20, resistor R21, capacitor C6, and capacitor C7; where a control terminal of the switch tube Q1 is connected to the short-circuit current detect circuit and connected to a power supply terminal through the resistor R20, an input terminal of the switch tube Q1 is connected to the power supply terminal through resistor R21, an output terminal of the switch tube Q1 is connected to a terminal of the resistor R6 and is grounded through the resistor R7, and another terminal of the resistor R6 is connected to an input pin of the delay chip and is grounded through the capacitor C6; one terminal of the resistor R3 is connected to pin SET of the delay chip, and another terminal of the resistor R3 is grounded; the resistor R4 and the resistor R5 are connected in series and a common terminal thereof is connected to pin DIV of the delay chip, another terminal of the resistor R4 is connected to pin V+ of the delay chip, and another terminal of the resistor R5 is grounded; one terminal of the capacitor C7 is connected to pin V+ of the delay chip, and another terminal of the capacitor C7 is grounded; and one terminal of the resistor R9 is connected to an output pin of the delay chip, and another terminal of the resistor R9 is connected to pin CP of the latch and grounded through the resistor R10.

In one embodiment, a short-circuit overcurrent fault confirmation time is adjusted by adjusting a resistor R3/resistor R4/resistor R5 ratio, so as to match high-voltage battery systems with different short-circuit withstanding capabilities.

In one embodiment, the short-circuit current process circuit further includes resistor R11, resistor R12, resistor R13, resistor R14, resistor R15, resistor R16, resistor R17, capacitor C8, diode D1, and diode D2, where one terminal of the resistor R11 is connected to pin D of the latch, another terminal of the resistor R11 is connected to the power supply terminal; one terminal of the capacitor C8 is connected to a power supply pin of the latch, and another terminal of the capacitor C8 is grounded; pin Q of the latch is connected to an anode of the diode D1, an anode of the diode D2, and one terminal of the resistor R14, and another terminal of the resistor R14 is connected to the drive module of the active fuse and is grounded through the resistor R15; one terminal of the resistor R12 is connected to a cathode of the diode D1, and another terminal of the resistor R12 is connected to the digital signal detect module and grounded through the resistor R13; and one terminal of the resistor R16 is connected to the cathode of the diode D2, and another terminal of the resistor R16 is connected to the power supply chip module and grounded through the resistor R17.

In one embodiment, the short-circuit current process circuit further includes switch tube Q2, resistor R18, and resistor R19, where a control terminal of the switch tube Q2 is connected to a host computer and grounded through the resistor R18; an input terminal of the switch tube Q2 is connected to an enable pin of the latch and connected to the power supply terminal through the resistor R19, and an output terminal of the switch tube Q2 is grounded.

In one embodiment, the latch is configured to selectively enable or disable an a short-circuit overcurrent detection function of the active fuse under control of the host computer.

In one embodiment, the latch is further configured to, after occurrence of an overcurrent fault, clear original information under control of the host computer to proceed to a next overcurrent fault detection cycle.

BRIEF DESCRIPTION OF DRAWINGS

To describe the technical solutions in the embodiments of this application more clearly, the following briefly describes the accompanying drawings required for the embodiments. Apparently, the accompanying drawings in the following description show only some embodiments of this application, and persons of ordinary skill in the art may still derive other drawings from these accompanying drawings without creative efforts.

DESCRIPTION OF EMBODIMENTS

Figure 1:
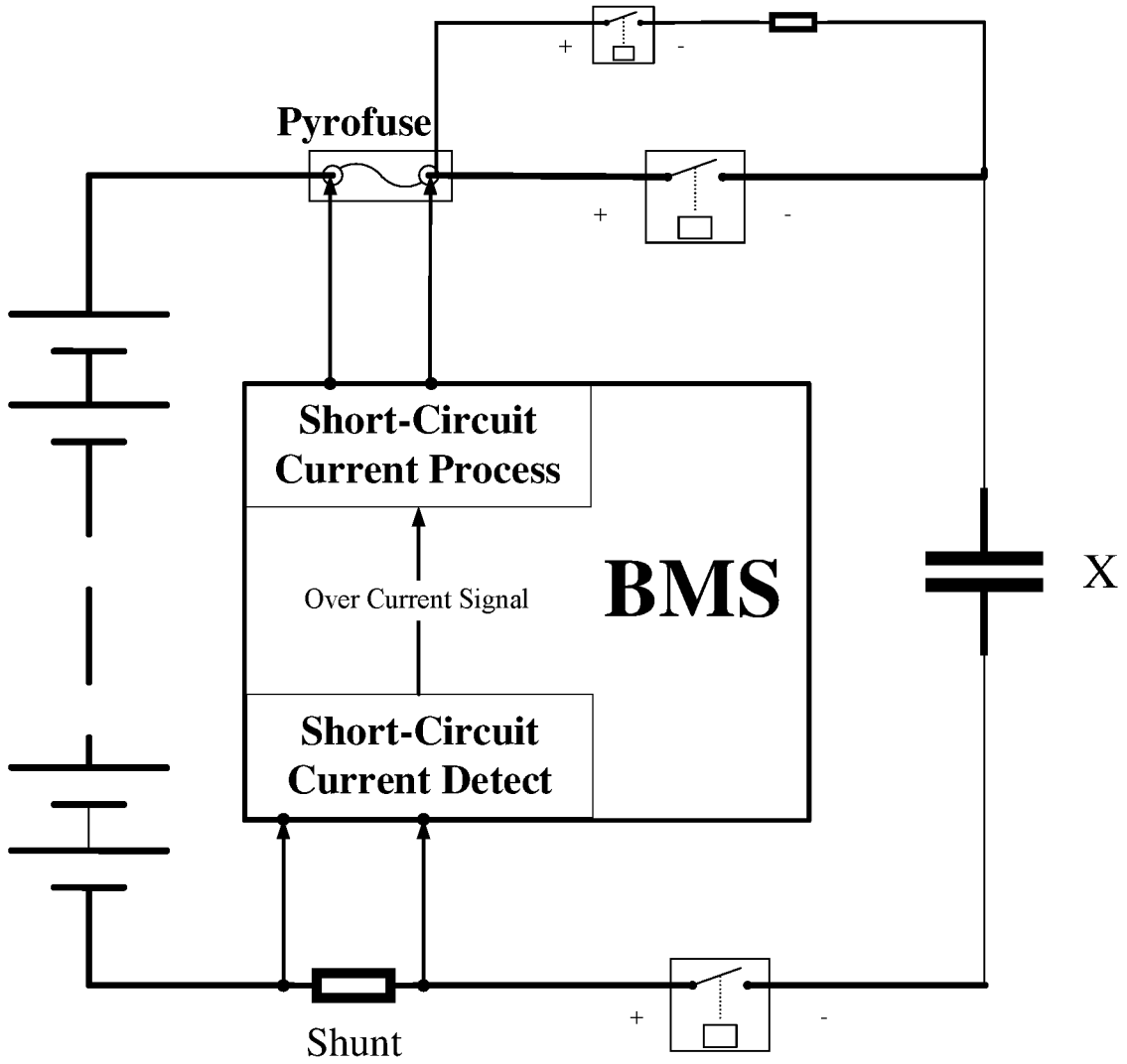
FIG. 1 is a structural block diagram of a battery pack active fuse control apparatus according to an embodiment.

To make the objectives, technical solutions, and advantages of this application clearer and more comprehensible, the following further describes this application in detail with reference to the accompanying drawings and embodiments. It should be understood that the specific embodiments described herein are merely used to explain this application but are not intended to limit this application.

Unless otherwise defined, all technical and scientific terms used herein shall have the same meanings as commonly understood by those skilled in the art to which this application pertains. The terms used herein in the specification of this application are for description of specific embodiments only without any intention to limit this application.

It should be noted that when a component is deemed as being "connected to" another component, it may be directly connected to the another component, or may be connected to the another component with a component in between. In the following embodiments, if there are electric signals or data transmission among connected circuits, modules, and units, "connection" should be understood as "electrical connection", "communication connection", and the like.

As used herein, unless otherwise clearly stated in the context, singular forms "a", "an", and "the" can also include plural forms. It should also be noted that, the term "include/contain" or "have" is used to clearly indicate existence of the feature, integer, step, operation, assembly, component, or groups thereof, but does not exclude existence or addition of one or more other features, integers, steps, operations, assemblies, components, or groups thereof. Terms used in this specification include a combination of one or more of the listed items.

Short-circuit protection fuses in conventional electric vehicle battery packs are categorized as active or passive. The breaking time of a passive fuse is related to its own characteristics. When the fuse is undersized, it is prone to false triggering, while oversizing the fuse can lead to the inability to protect the relay. Furthermore, there is a wide variety of relay models and specifications available in the current market, making it challenging to select a suitable fuse that matches the battery pack system.

When an active fuse is used, after a short-circuit occurs in a battery pack, the BMS detects the overcurrent and drives the fuse to break. A conventional scheme involves detecting overcurrent through a current sensor sampling and subsequently executing the operation through software control. However, due to the fact that the current sensor only works when the BMS is awake or the current packet period is limited to 10 ms, it is not possible to detect a short circuit in sleep mode, and the detection time is too long to achieve breaking of the fuse within 10 ms.

Based on this, this application provides an active fuse fusing scheme with adjustable short-circuit time and short-circuit current for a high-voltage system. The BMS performs shunt current collection, overcurrent fault confirmation, and driving of an active fuse to break through pure hardware, achieving a requirement of breaking the active fuse in as short as 3 ms under different set currents. Through the adjustment of the resistor value ratios in the BMS, the overcurrent current and overcurrent time can be adjusted arbitrarily to adapt to different high-voltage battery packs. Additionally, the BMS hardware overcurrent protection function can be selectively enabled or disabled through software, allowing users to configure the protection according to specific scenarios. Even when in sleep mode, the BMS can detect a short circuit and break the active fuse. In the event of detecting a short circuit in the battery pack in sleep mode, the BMS can wake up the entire vehicle and report the short-circuit fault for background alarm.

This solution addresses the problem of difficulty in matching fuses with battery packs and greatly reduces the breaking time of the active fuse. It also solves the problem of traditional active fuses that the detection and breaking can be performed only when the BMS is waked up and is in working state. Through the provision of hierarchical short-circuit current and short-circuit withstanding time adapting the battery pack systems of users, a design that fully meets the requirements is achieved through changing the resistor selection in the BMS hardware. The hardware solution allows the active fuse to achieve a breaking time of less than 3 ms, reducing the short-circuit duration and improving the overall safety of the vehicle system.

In an embodiment, as shown in FIG. 1, a battery pack active fuse control apparatus is provided, including a BMS and a shunt resistor Shunt, where the BMS includes a short-circuit current detect circuit (Short-Circuit Current Detect) and a short-circuit current process circuit (Short-Circuit Current Process) that are constantly powered. The shunt resistor Shunt and the active fuse are connected in series with a power supply loop of a battery pack. The short-circuit current detect circuit is connected to the shunt resistor Shunt and the short-circuit current process circuit. The short-circuit current process circuit is connected to the active fuse. The short-circuit current detect circuit is configured to sample current flowing through the shunt resistor Shunt to obtain a shunt current, and when the shunt current exceeds a set threshold, output a short-circuit overcurrent signal (Over Current Signal) to the short-circuit current process circuit, and the short-circuit current process circuit, upon receiving the short-circuit overcurrent signal, controls the active fuse to break.

In one embodiment, the active fuse may include a fuse (Pyrofuse) connected in series with the power supply loop, and a drive module that controls the fuse. The short-circuit current process circuit is connected to the drive module, which can be a driving switch. Furthermore, in one embodiment, the power supply loop may also be connected in series with components such as capacitors X, resistors, and control switches. The values of the set threshold are not unique and can be adjusted by tuning the parameters of the internal components in the short-circuit current detect circuit. When the shunt current exceeds the set threshold, it can be determined that a short-circuit overcurrent has occurred. Then, the short-circuit current detect circuit outputs a short-circuit overcurrent signal to the short-circuit current process circuit. Upon receiving the short-circuit overcurrent signal, the short-circuit current process circuit outputs a signal to the drive module of the active fuse to drive the active fuse to break.

In one embodiment, the BMS further includes a power supply chip module, and the short-circuit current process circuit is further configured to, upon receiving the short-circuit overcurrent signal, wake up the power supply chip module, implementing the battery pack short-circuit wake-up function when the BMS is in sleep mode.

Further, in one embodiment, the BMS further includes a digital signal detect module, and the short-circuit current process circuit is further configured to, upon receiving the short-circuit overcurrent signal, control the digital signal detect module to perform overcurrent fault recording so that BMS software is utilized to record the short-circuit overcurrent fault of the battery pack system, store the DTC (diagnostic trouble code), and generate a background alarm.

The foregoing battery pack active fuse control apparatus adopts a short-circuit current detect circuit and a short-circuit current process circuit that are constantly powered in the BMS to perform current sampling and overcurrent detection, respectively. The short-circuit current detect circuit outputs a short-circuit overcurrent signal to the short-circuit current process circuit when the shunt current is greater than a set threshold. The short-circuit current process circuit controls the active fuse to break upon receiving a short-circuit overcurrent signal. In this way, the short-circuit overcurrent detection can be performed without the need to wake up the BMS, and the active fuse can break in a timely manner when a short-circuit is detected, which improves the reliability of the control of the active fuse.

Figure 2:
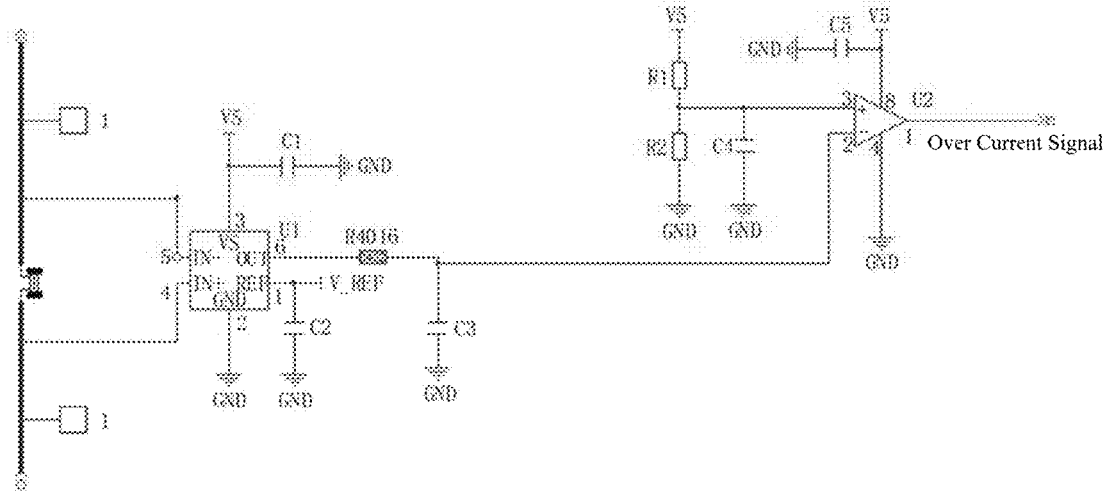
FIG. 2 is a structural schematic diagram of a short-circuit current detect circuit according to an embodiment.

It should be understood that the specific structures of the short-circuit current detect circuit and the short-circuit current process circuit are not unique. In one embodiment, as shown in FIG. 2, the short-circuit current detect circuit includes a current sampling chip U1 and a voltage comparator U2, the current sampling chip U1 is connected to the shunt resistor Shunt and the voltage comparator U2, and the voltage comparator U2 is connected to the short-circuit current process circuit. Pin IN+4 and Pin IN−5 of the current sampling chip U1 are connected to the two ends of the shunt resistor Shunt, respectively. Pin VS 3 of the current sampling chip U1 is connected to the power supply terminal V5. Pin GND 2 of the current sampling chip U1 is grounded. Pin REF 1 of the current sampling chip U1 is connected to the reference signal V_REF. Pin OUT 6 of the current sampling chip U1 is connected to the inverting input terminal 2 of the voltage comparator U2. The power supply terminal 8 of the voltage comparator U2 is connected to the power supply terminal V5, and the ground terminal 4 of the voltage comparator U2 is grounded. The power supply terminal V5 is a constant power supply terminal, specifically it may be powered by utilizing a battery pack, or by utilizing an energy storage unit.

In one embodiment, as shown in FIG. 2, the short-circuit current detect circuit further includes resistor R1 and resistor R2, the resistor R1 and the resistor R2 are connected in series and a common terminal thereof is connected to a non-inverting input terminal 3 of the voltage comparator U2, another terminal of the resistor R1 is connected to a power supply terminal V5, another terminal of the resistor R2 is grounded, an inverting input terminal 2 of the voltage comparator U2 is connected to the current sampling chip U1, and an output terminal 1 of the voltage comparator U2 is connected to the short-circuit current process circuit.

Further, in one embodiment, as shown in FIG. 2, the short-circuit current detect circuit further includes capacitor C1, capacitor C2, capacitor C3, capacitor C4, capacitor C5, and resistor R4016, where one terminal of the capacitor C1 is connected to pin VS 3 of the current sampling chip U1, and another terminal of the capacitor C1 is grounded; one terminal of the capacitor C2 is connected to pin REF 1 of the current sampling chip U1, and another terminal of the capacitor C2 is grounded; one terminal of the resistor R4016 is connected to pin OUT 6 of the current sampling chip U1, another terminal of the resistor R4016 is connected to an inverting input terminal 2 of the voltage comparator U2, and the another terminal of the resistor R4016 is further grounded through the capacitor C3; one terminal of the capacitor C4 is connected to a non-inverting input terminal 3 of the voltage comparator U2, and another terminal of the capacitor C4 is grounded; and one terminal of the capacitor C5 is connected to a power supply terminal 8 of the voltage comparator, and another terminal of the capacitor C5 is grounded.

Figure 3:
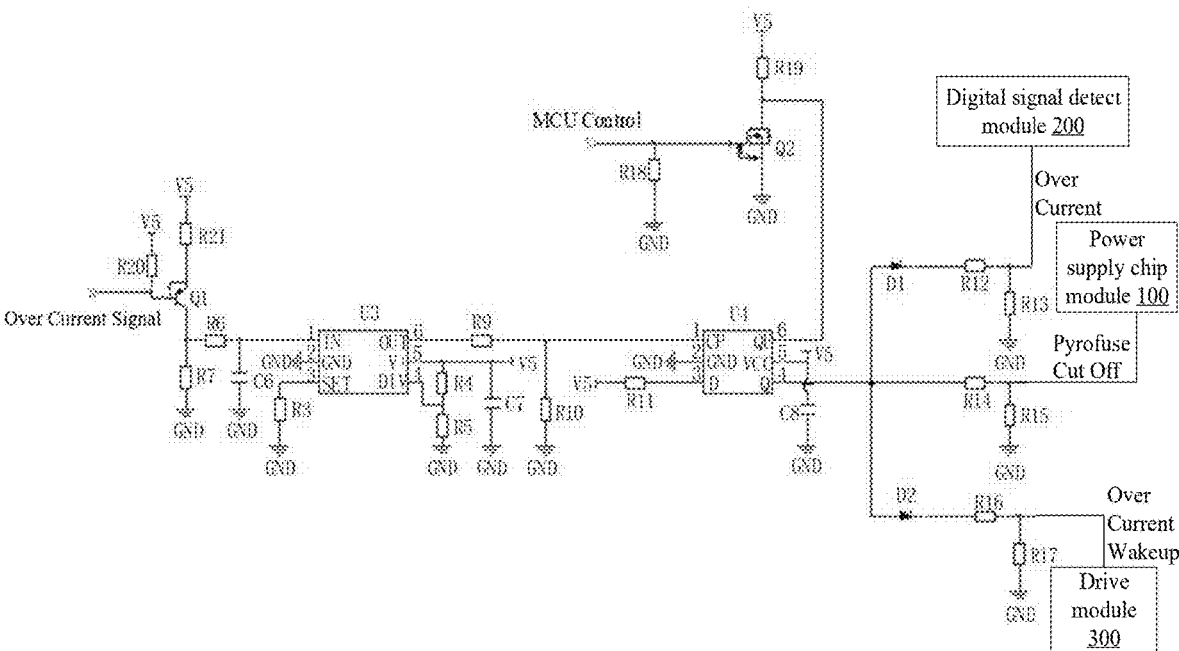
FIG. 3 is a structural schematic diagram of a short-circuit current process circuit according to an embodiment.

In one embodiment, as shown in FIG. 3, the short-circuit current process circuit includes a delay chip U3 and a latch U4, where the delay chip U3 is connected to the short-circuit current detect circuit and the latch U4, and the latch U4 is connected to a power supply chip module 100, a digital signal detect module 200, and a drive module 300 of the active fuse. Pin GND 2 of the delay chip U3 is grounded, pin GND 2 of the latch U4 is grounded, and the power supply pin 5 of the latch U4 is connected to the power supply terminal V5.

Further, in one embodiment, as shown in FIG. 3, the short-circuit current process circuit further includes switch tube Q1, resistor R3, resistor R4, resistor R5, resistor R6, resistor R7, resistor R9, resistor R10, resistor R20, resistor R21, capacitor C6, and capacitor C7. The switch tube Q1 may be a MOS tube or a triode. In this embodiment, the switch tube Q1 is a triode.

Specifically, the control terminal of the switch tube Q1 is connected to the short-circuit current detect circuit, specifically to the output terminal 1 of the voltage comparator U2 in the short-circuit current detect circuit. The control terminal of the switch tube Q1 is further connected to the power supply terminal V5 through the resistor R20. The input terminal of the switch tube Q1 is connected to the power supply V5 through the resistor R21. The output terminal of the switch tube Q1 is connected to one terminal of the resistor R6 and is grounded through the resistor R7, and another terminal of the resistor R6 is connected to an input pin 1 of the delay chip U3 and is grounded through the capacitor C6; one terminal of the resistor R3 is connected to pin SET 3 of the delay chip U3, and another terminal of the resistor R3 is grounded; the resistor R4 and the resistor R5 are connected in series and a common terminal thereof is connected to pin DIV 4 of the delay chip, another terminal of the resistor R4 is connected to pin V+5 of the delay chip U3, and another terminal of the resistor R5 is grounded; one terminal of the capacitor C7 is connected to pin V+5 of the delay chip U3, and another terminal of the capacitor C7 is grounded; and one terminal of the resistor R9 is connected to an output pin 6 of the delay chip U3, and another terminal of the resistor R9 is connected to pin CP 1 of the latch U4 and grounded through the resistor R10.

In one embodiment, as shown in FIG. 3, the short-circuit current process circuit further includes resistor R11, resistor R12, resistor R13, resistor R14, resistor R15, resistor R16, resistor R17, capacitor C8, diode D1, and diode D2, where one terminal of the resistor R11 is connected to pin D 3 of the latch U4, another terminal of the resistor R11 is connected to the power supply terminal V5; one terminal of the capacitor C8 is connected to a power supply pin 5 of the latch U4, and another terminal of the capacitor C8 is grounded; pin Q 4 of the latch U4 is connected to an anode of the diode D1, an anode of the diode D2, and one terminal of the resistor R14, and another terminal of the resistor R14 is connected to the drive module of the active fuse and is grounded through the resistor R15; one terminal of the resistor R12 is connected to a cathode of the diode D1, and another terminal of the resistor R12 is connected to the digital signal detect module and grounded through the resistor R13; and one terminal of the resistor R16 is connected to the cathode of the diode D2, and another terminal of the resistor R16 is connected to the power supply chip module and grounded through the resistor R17.

Furthermore, in one embodiment, as shown in FIG. 3, the short-circuit current process circuit further includes switch tube Q2, resistor R18, and resistor R19, where a control terminal of the switch tube Q2 is connected to a host computer and grounded through the resistor R18; an input terminal of the switch tube Q2 is connected to an enable pin 6 of the latch U4 and connected to the power supply terminal V5 through the resistor R19, and an output terminal of the switch tube Q2 is grounded. The switch tube Q2 may also be a MOS tube or a triode, and in this embodiment, the switch tube Q2 is a MOS tube. Further, the host computer may be an MCU (Micro Control Unit, micro control unit).

Specifically, the overall design of the battery pack active fuse control apparatus is as follows: when the BMS detects that a shunt current is greater than the set threshold, it determines that a hardware overcurrent fault occurs. The BMS processes the short-circuit overcurrent fault to implement functions of directly driving the active fuse to break, waking up the BMS during sleep at a short circuit, and BMS fault reporting.

FIG. 1 illustrates the design of the battery pack active fuse system. The shunt Shunt resistor is positioned at the high-voltage main negative relay side close to the battery. The left and right sides of the Shunt resistor are connected to the BMS via wiring harnesses for current collection and short-circuit overcurrent fault determination. The selection of the Shunt resistor depends on the short-circuit capability of the battery pack and the voltage acquisition range of the built-in current sampling chip in the BMS: (1) The Shunt resistor has a body current withstanding capability greater than the maximum short-circuit capability of a battery system; and (2) when a short-circuit occurs with the maximum short-circuit current of the system, the voltage difference between the left and right sides of the Shunt resistor must not exceed the specifications of the built-in current sampling chip in the BMS.

The active fuse is positioned at the side of the main positive relay of the battery pack close to the battery, the high-voltage side of the fuse is connected to the positive discharge loop of the battery, and the driving switch at the low-voltage side is connected to the built-in high-side and low-side driving circuits of the BMS via wiring harnesses.

The current withstanding capability of the active fuse needs to be greater than the maximum short-circuit capability of a battery system.

FIG. 2 is a structural schematic diagram of a BMS short-circuit current detect circuit, and the short-circuit current detect circuit includes a current sampling chip and a voltage comparator. The hardware is designed so that the current sampling chip and the voltage comparator chip are constantly powered. The purpose is to ensure current detection and short-circuit overcurrent signal output to the back-end circuit even when the BMS is in sleep mode. The current detection chip linearly outputs the current signal as a voltage signal based on the voltage drop across the Shunt resistor. The output voltage signal is compared with a preset comparator reference voltage and then a short-circuit overcurrent signal Over Current Signal is output. The resistance values of resistors R1 and R2 in FIG. 2 can be converted to voltage values and adjusted based on the short-circuit capability set for the battery pack system to achieve the function of adjustable overcurrent signal of the battery system, thus matching high-voltage battery systems with different short-circuit currents.

FIG. 3 is a structural schematic diagram of a BMS short-circuit current process circuit, and the short-circuit current process circuit includes a delay chip and a latch. In the hardware design as shown in FIG. 3, the transistor, the delay chip, and the latch are constantly powered. The purpose is to ensure that short-circuit overcurrent signal processing can be performed even in sleep mode. When the BMS detects an Over Current Signal during sleep or wake-up mode, it performs output to the delay chip for fault delay confirmation. With the resistor R3/R4/R5 ratio adjusted, the short-circuit overcurrent fault confirmation time can be adjusted to match high-voltage battery systems with different short-circuit withstanding capabilities. After the delay chip confirms the fault, it performs output through the latch and the output signals are Pyrofuse Cut Off, Over Current Wakeup, and Over Current.

Pyrofuse Cut Off is connected to the BMS hardware active fuse drive module. It drives the active fuse to break through a hardware behavior after detecting a short-circuit overcurrent in the battery pack. The entire process is processed at a pure hardware level without software involvement, allowing the active fuse to break within 3 ms since the occurrence of a short-circuit overcurrent fault.

Over Current Wakeup is connected to the BMS power supply chip module. When this level signal is set to a high level, the BMS is waked up to start operation, enabling short-circuit wake-up of the battery pack during sleep of the BMS.

Over Current is connected to the BMS digital signal detect module. When a high-level signal is detected, the BMS software records the short-circuit overcurrent fault of the battery pack system, stores it as a DTC, and generates a background alarm.

Additionally, in FIG. 3, the MCU Control signal is connected to the latch via a MOS tube. Through control of the MCU, the hardware short-circuit overcurrent detection function can be selectively enabled or disabled. Users can choose to enable or disable the short-circuit overcurrent detection function of the active fuse based on the actual usage scenario of the high-voltage system. In addition, when a fault occurs, the MCU control can be used to clear the original information of the latch, so that the system can start the next hardware overcurrent fault detection cycle.

Technical features in the foregoing embodiments may be combined in any way. For brevity of description, possible combinations of the technical features in the foregoing embodiments are not described all. However, as long as there is no contradiction among combinations of these technical features, all the combinations should be considered within a range recorded in this specification.

The foregoing embodiments only represent several implementations of this application, and descriptions thereof are specific and detailed, but should not be construed as a limitation on the application scope of this patent. It should be noted that those of ordinary skill in the art may further make several modifications and improvements without departing from the concept of this application, and these modifications and improvements also fall within the protection scope of this application. Therefore, the protection scope of this application should be subject to the appended claims.

What is claimed is:

1. A battery pack active fuse control apparatus, comprising:
a shunt resistor, wherein the shunt resistor and an active fuse are connected in series with a power supply loop of a battery pack; and
a battery management system;
wherein:
the battery management system comprises a short-circuit current detect circuit and a short-circuit current process circuit that are constantly powered;
the short-circuit current detect circuit is connected to the shunt resistor and the short-circuit current process circuit, and the short-circuit current process circuit is connected to the active fuse;
the short-circuit current detect circuit is configured to sample current flowing through the shunt resistor to obtain a shunt current, and when the shunt current exceeds a set threshold, output a short-circuit overcurrent signal to the short-circuit current process circuit, and the short-circuit current process circuit, upon receiving the short-circuit overcurrent signal, controls the active fuse to break; and
the short-circuit current detect circuit comprises a current sampling chip and a voltage comparator, the current sampling chip is connected to the shunt resistor and the voltage comparator, and the voltage comparator is connected to the short-circuit current process circuit.

2. The battery pack active fuse control apparatus according to claim 1, wherein the battery management system further comprises a power supply chip module, and the short-circuit current process circuit is further configured to, upon receiving the short-circuit overcurrent signal, wake up the power supply chip module.

3. The battery pack active fuse control apparatus according to claim 1, wherein the battery management system further comprises a digital signal detect module, and the short-circuit current process circuit is further configured to, upon receiving the short-circuit overcurrent signal, control the digital signal detect module to perform overcurrent fault recording.

4. The battery pack active fuse control apparatus according to claim 1, wherein the shunt resistor is selected based on a short-circuit capability of the battery pack and a voltage sampling range of the current sampling chip.

5. The battery pack active fuse control apparatus according to claim 4, wherein a body current withstanding capability of the shunt resistor is greater than a maximum short-circuit capability of a battery system, and when the battery system is short-circuited at a maximum short-circuit current, a voltage difference across the shunt resistor is within the voltage sampling range of the current sampling chip.

6. The battery pack active fuse control apparatus according to claim 1, wherein the short-circuit current detect circuit further comprises a first resistor and a second resistor, the first resistor and the second resistor are connected in series and a common terminal thereof is connected to a non-inverting input terminal of the voltage comparator, another terminal of the first resistor is connected to a power supply terminal, another terminal of the second resistor is grounded, an inverting input terminal of the voltage comparator is connected to the current sampling chip, and an output terminal of the voltage comparator is connected to the short-circuit current process circuit.

7. The battery pack active fuse control apparatus according to claim 6, wherein:
the short-circuit current detect circuit further comprises a first capacitor, a second capacitor, a third capacitor, a fourth capacitor, a fifth capacitor, and a specific resistor, wherein one terminal of the first capacitor is connected to a first pin of the current sampling chip, and another terminal of the first capacitor is grounded; one terminal of the second capacitor is connected to a second pin of the current sampling chip, and another terminal of the second capacitor is grounded;
one terminal of the specific resistor is connected to an output pin of the current sampling chip, another terminal of the specific resistor is connected to an inverting input terminal of the voltage comparator, and the another terminal of the specific resistor is further grounded through the third capacitor;
one terminal of the fourth capacitor is connected to a non-inverting input terminal of the voltage comparator, and another terminal of the fourth capacitor is grounded; and
one terminal of the fifth capacitor is connected to a power supply terminal of the voltage comparator, and another terminal of the fifth capacitor is grounded.

8. The battery pack active fuse control apparatus according to claim 1, wherein the short-circuit current process circuit comprises a delay chip and a latch, wherein the delay chip is connected to the short-circuit current detect circuit and the latch, and the latch is connected to a power supply chip module, a digital signal detect module, and a drive module of the active fuse.

9. The battery pack active fuse control apparatus according to claim 8, wherein:
the short-circuit current process circuit further comprises a first switch tube, a first resistor, a second resistor, a third resistor, a fourth resistor, a fifth resistor, a sixth resistor, an seventh resistor, a first specific resistor, a second specific resistor, a first capacitor, and a second capacitor;
a control terminal of the first switch tube is connected to the short-circuit current detect circuit and connected to a power supply terminal through the first specific resistor, an input terminal of the first switch tube is connected to the power supply terminal through second specific resistor, an output terminal of the first switch tube is connected to a terminal of the fourth resistor and is grounded through the fifth resistor, and another terminal of the fourth resistor is connected to an input pin of the delay chip and is grounded through the first capacitor;

one terminal of the first resistor is connected to a first pin of the delay chip, and another terminal of the first resistor is grounded;
the second resistor and the third resistor are connected in series and a common terminal thereof is connected to a second pin of the delay chip, another terminal of the second resistor is connected to a third pin of the delay chip, and another terminal of the third resistor is grounded;
one terminal of the second capacitor is connected to the third pin of the delay chip, and another terminal of the second capacitor is grounded; and
one terminal of the sixth resistor is connected to an output pin of the delay chip, and another terminal of the sixth resistor is connected to a fourth pin of the latch and grounded through the seventh resistor.

10. The battery pack active fuse control apparatus according to claim 9, wherein a short-circuit overcurrent fault confirmation time is adjusted by adjusting a the first resistor/the second resistor/the third resistor ratio, so as to match high-voltage battery systems with different short-circuit withstanding capabilities.

11. The battery pack active fuse control apparatus according to claim 9, wherein:
the short-circuit current process circuit further comprises an eighth resistor, a nineth resistor, a tenth resistor, an eleventh resistor, a twelfth resistor, a thirteenth resistor, a fourteenth resistor, a third capacitor, a first diode, and a second diode;
one terminal of the eighth resistor is connected to a fifth pin of the latch, another terminal of the eighth resistor is connected to the power supply terminal;
one terminal of the third capacitor is connected to a power supply pin of the latch, and another terminal of the third capacitor is grounded;
a sixth pin of the latch is connected to an anode of the first diode, an anode of the second diode, and one terminal of the eleventh resistor, and another terminal of the eleventh resistor is connected to the drive module of the active fuse and is grounded through the twelfth resistor;
one terminal of the nineth resistor is connected to a cathode of the first diode, and another terminal of the nineth resistor is connected to the digital signal detect module and grounded through the tenth resistor; and
one terminal of the thirteenth resistor is connected to the cathode of the second diode, and another terminal of the thirteenth resistor is connected to the power supply chip module and grounded through the fourteenth resistor.

12. The battery pack active fuse control apparatus according to claim 11, wherein:
the short-circuit current process circuit further comprises a second switch tube, a fifteenth resistor, and a sixteenth resistor;
a control terminal of the second switch tube is connected to a host computer and grounded through the fifteenth resistor; and
an input terminal of the second switch tube is connected to an enable pin of the latch and connected to the power supply terminal through the sixteenth resistor, and an output terminal of the second switch tube is grounded.

13. The battery pack active fuse control apparatus according to claim 12, wherein the latch is configured to selectively enable or disable a short-circuit overcurrent detection function of the active fuse under control of the host computer.

14. The battery pack active fuse control apparatus according to claim 12, wherein the latch is further configured to, after occurrence of an overcurrent fault, clear original information under control of the host computer to proceed to a next overcurrent fault detection cycle.

15. A battery pack active fuse control apparatus, comprising:

a shunt resistor, wherein the shunt resistor and an active fuse are connected in series with a power supply loop of a battery pack; and a battery management system;

wherein:

the battery management system comprises a short-circuit current detect circuit and a short-circuit current process circuit that are constantly powered;

the short-circuit current detect circuit is connected to the shunt resistor and the short-circuit current process circuit, and the short-circuit current process circuit is connected to the active fuse;

the short-circuit current detect circuit is configured to sample current flowing through the shunt resistor to obtain a shunt current, and when the shunt current exceeds a set threshold, output a short-circuit overcurrent signal to the short-circuit current process circuit, and the short-circuit current process circuit, upon receiving the short-circuit overcurrent signal, controls the active fuse to break; and the short-circuit current process circuit comprises a delay chip and a latch, the delay chip is connected to the short-circuit current detect circuit and the latch, and the latch is connected to a power supply chip module, a digital signal detect module, and a drive module of the active fuse.

* * * * *